United States Patent [19]

Reynolds

[11] 3,897,550

[45] *July 29, 1975

[54] METHOD FOR ADMINISTERING WATER SOLUBLE DRUGS, NUTRIENTS AND OTHER SOLUTES TO A MAMMAL

[75] Inventor: Beverly L. Reynolds, Dallas, Tex.

[73] Assignee: Cybersol, Inc., Dallas, Tex.

[ * ] Notice: The portion of the term of this patent subsequent to July 11, 1989, has been disclaimed.

[22] Filed: July 21, 1972

[21] Appl. No.: 273,849

Related U.S. Application Data

[63] Continuation-in-part of Ser. No. 149,081, June 1, 1971, abandoned, which is a continuation-in-part of Ser. No. 885,295, Dec. 15, 1969, Pat. No. 3,676,553.

[52] U.S. Cl. ................ 424/93; 424/101; 424/128; 424/153; 424/154; 424/162; 424/177; 424/271
[51] Int. Cl.² ........................................ A61K 27/00
[58] Field of Search ............ 424/128, 153, 154, 162, 424/93, 101, 177, 271

[56] References Cited
UNITED STATES PATENTS

| | | | |
|---|---|---|---|
| 233,063 | 10/1880 | Boughton | 424/128 |
| 2,224,252 | 12/1940 | Callaway | 99/1 |
| 2,265,453 | 12/1941 | Schmidt | 424/128 |
| 3,337,404 | 8/1967 | Polli et al | 424/153 |
| 3,356,570 | 12/1967 | Butcher | 424/153 |
| 3,676,553 | 7/1972 | Reynolds | 424/128 |

*Primary Examiner*—Stanley J. Friedman
*Attorney, Agent, or Firm*—Giles C. Clegg, Jr.

[57] ABSTRACT

Drugs, nutrients and other solutes are administered to fixed and mobile tissue cells of the mammal in an aqueous solution containing about 75–200 mM/L of $Na^+$, about 7–75 mM/L $K^+$, about 12–28 mM/L $HCO_3^-$, about 70–195 mM/L $Cl^-$ and preferably containing about 3–8 mM/L $Mg^{++}$ and about 3–8 mM/L $HPO_4^=$ and/or $SO_4^=$, and/or acetate, and/or gluconate$^-$; the solution having a pH of about 7.4 to 8.4 and an osmolality of about 170–460, preferably about 260–340, more preferably about 290–310, and most preferably 300 milliosmols per liter. The composition can contain other additives, e.g. stabilizing agents, and the solutes to be carried, e.g., antibiotics, vitamins, nutrients, and other solutes.

6 Claims, No Drawings

METHOD FOR ADMINISTERING WATER SOLUBLE DRUGS, NUTRIENTS AND OTHER SOLUTES TO A MAMMAL

This application is a continuation-in-part of my earlier copending U.S. Pat. application, Ser. No. 149,081 filed June 1, 1971, entitled "Method for Administering Water Soluble Drugs, Nutrients and Other Solutes to a Mammal", now abandoned which is in turn a continuation-in-part of my earlier filed U.S application Ser. No. 885,295, filed Dec. 15, 1969, now U.S. Pat. No. 3,676,553.

BACKGROUND OF THE INVENTION

This invention relates to methods for transporting and dispersing pharmaceutical preparations within the body of a living animal. More particularly, it relates to the use of aqueous solutions as carriers for physiologically active substances as pharmaceutical preparations, vitamins, protein, blood cells, etc., without deleteriously affecting the physiologically active substance and which may be readily dispersed in the living body without causing undesirable chemical or physiological reactions.

Various artificial carrier media are commonly used for parenterally administered compositions. Typical carrier media are such compositions as water for injection, U.S.P., lactated Ringer's solution, normal saline, and dextrosesaline. While these solutions can be used as biologically and chemically inert solvents or carriers for most physiologically active substances, they may have undesirable physiological effects in the living body in which they are used, and may be quite ineffective in transporting the substances through the extracellular water of the patient to the desired location in either the intracellular water or extracellular water, or both. Furthermore, most conventional carrier solutions are slightly acidic, causing inactivation or deterioration of the substance prior to injection into the living body. The compositions of known commercially available artificial transportation liquids are shown together with the composition of human plasma in the following Table, from which it is seen that $HCO_3^-$ ion present in a relatively high concentration in human plasma does not exist in the artificial transportation liquids:

The main reason why the artificial transportation liquids do not contain $HCO_3^-$ ion is due to the formation of $CO_3^{--}$ ion in the essential heating and sterilizing steps, the $CO_3^{--}$ ion being combined with $Ca^{++}$ ion or other ions to give an insoluble salt as a precipitate. Thus, as seen in the above Table, the artificial transportation liquids contain various organic acids (e.g. acetic acid, gluconic acid, lactic acid) being participated in the formation of $HCO_3^-$ ion in the consequence of metabolism so as to attain the same effect as obtained by the incorporation of $HCO_3^-$ ion itself. When, however, a large amount of blood is lost as in the cases of serious wound and surgical operation, the metabolitic function of the living bodies is considerably depressed so that the immediate formation of $HCO_3^-$ is difficult. Moreover, any unfavorable side effect is unavoidable, because the composition of the artificial transportation liquids is anyhow different from that of blood plasma itself.

Considering the above situation, the appearance of a transportation liquid containing $HCO_3^-$ ion itself and having the similar composition to extracellular with a high stability has been desired, because of its extreme usefulness and advantage. As the results of the extensive study, there has now been completed the present invention directed to such transportation liquid.

The composition of the present invention corresponds to that of the average extracellular solution of various mammals including human beings determined by the thermo-dynamic equation and the computor analysis and confirmed by the experimental test. Therefore, the presence and numerical limitation of the said ions are essential. If anyone of these factors is not satisfied, then the balance between the extracellular solution and the intracellular solution is broken so that the concentrations of the solutes in the intracellular solution are varied to afford an unfavorable influence on living bodies which received the composition. Thus, it may be said to be the first composition similar to extracellular containing $HCO_3^-$ ion in a stable state, which is an ideal carrier for a pharmaceutical substance of parenteral use.

In preparation of the composition of the invention, the order of addition of the essential ion sources to water is not important and may be optional.

Any pharmaceutical substance may be incorporated into the composition of the invention, insofar as it does not cause any precipitation of said essential ions.

The composition of the invention may be used as a dilution liquid for concentrated blood plasma.

Effectiveness of the substance at the presumed site of action is dependent upon concentration, provided its chemical and pharmaceutical activity has not been reduced significantly during solution in and storage in the aqueous medium or by its movement from the site of administration to the site of action. Transport media which enhance transit time after administration will, of course, provide a higher concentration of substance whose activity is greater than those media whose composition does not permit rapid transit time.

| Solution | Approximate pH | Cations (MEq/L) | | | | Cl | Phosphate | Anions (mEq/L) | | | |
|---|---|---|---|---|---|---|---|---|---|---|---|
| | | Na | K | Mg | Ca | | | $HCO_3$ | Acetate | Gluconate | Lactate |
| Human Plasma | 7.4 | 140 | 4–5 | 2–3 | 5 | 102 | 2.5 | 27 | — | — | 5 |
| Normosol R* pH 7.4 | 7.4 | 140 | 5 | 3 | — | 98 | — | — | 27 | 23 | — |
| Lactated Ringer's | 6.5 | 130 | 4 | — | 3 | 109 | — | — | — | — | 23 |
| Normal Saline | 5.4 | 154 | — | — | — | 154 | — | — | — | — | — |
| Dextrose 5% in saline | 4.6 | 154 | — | — | — | 154 | — | — | — | — | — |
| Polysal** | 6.2 | 140 | 10 | 3 | 10 | 103 | — | — | — | 55 | — |
| Plasma-Lyte*** | 6.2 | 140 | 10 | 3 | 5 | 103 | — | — | 47 | — | 8 |

*Trademark of Abbott Laboratories, North Chicago, Illinois
**Trademark of Cutter Laboratories, Berkeley 10, California
***Trademark of Baxter Laboratories, Inc., Morton Grove, Illinois Movement of the substance and medium is dependent upon its osmolality or osmolal pressure, e.g., the pressure produced in a solvent system by the action of the total number of particles dissolved in that solvent. In a living animal the solvent system is, of course, water.

The mean osmolality of extracellular water in humans and most animals is at or near 300 milliosmols per liter (mosm/L).

The pH of previous artificial carrier media has frequently been below that of the mean of animal body. Moreover, osmolality and chemical composition of the carrier with respect to the osmolality and chemical composition of the animal plasma or extracellular water has been largely ignored.

It is generally understood that the pH of the aqueous medium used as a carrier should be within the general limits observed and reported in human and animal patients in healthy and diseased condition. This range is reported to be between 6.7 and 7.8. In the diseased state either human or animal bodies frequently form compounds in both the extracellular water and the intracellular water which have acidic properties, thus altering the pH of the extracellular water toward acidity from the physiological mean of 7.2 to 7.6. Therefore, the pH of the transport medium should be increased beyond the general limits of the extracellular water in either human or animal patients, to 8.1 or greater, to compensate for the acidic tendencies. In either human or animal patients whose pH in the extracellular water does not alter in the acidic direction, a pH of 8.1 in the aqueous medium is tolerated without incident unless overloaded with the aqueous medium to a 20% excess of the total body weight or greater. Establishing the pH range in this manner inhibits inactivation of the carried additive while in storage in the aqueous medium before administration. Obviously, to be effective the additive must be active within the limits of pH of the extracellular water in human and in animals. Conventional solutions have largely ignored the distribution mechanism involved in distributing the artificial carier media, and the included substance, within the living body.

Notwithstanding, the desirability of utilizing pH levels established in accordance with the foregoing discussion, it should be understood that the carrier must have a pH compatible with the additive being administered, and that some additives require fairly low pH carriers. Furthermore, pH is not as critical a parameter of the carrier solution as other parameters, because the relatively small amounts of carrier liquid added to the body fluid system are readily buffered by the strong self buffering properties of the blood stream and total body fluid system.

SUMMARY OF THE INVENTION

In accordance with this invention solutes to be administered are solubilized in a water solution containing selected ones of the solutes of extracellular water. The solution contains specific cations and anions in percentages and concentrations to produce an osmolality within the range of 170 to 416, preferably 260–340, more preferably 290–310 and most preferably 300 milliosmols per liter and a pH preferably in the range of about 7.0–8.8, more preferably about 7.5–8.5 and most preferably 8.1.

In the preferred embodiment the solution contains about 72–200 millimols per liter of sodium ion ($Na^+$), 7–25 millimols per liter potassium ion ($K^+$), 3–8 millimols per liter magnesium ion ($Mg^{++}$), 308 millimols per liter phosphate ion ($HPO_4^=$) or sulfate ion ($SO_4^=$) or gluconate, or acetate, 12–28 illimols per liter bicarbonate ion $CHCO_3^-$) and 70–195 millimols per liter chloride ion (Cl).

The mol quantity of each solute, as chemical compounds, is adjusted to achieve mass and velocity balance, which results from adjusting the quantities of major, intermediate and minor solutes such that (1) the ratio of the mass-velocity product of the major to each intermediate solute is near equal, and (2) the quotient of the ratios of the major to minor and intermediate to minor is near equal to the ratio of the major to intermediate solute. Mass-velocity product balance produces a most nearly efficient mix of solutes with respect to solute activity, for the percent of each solute by weight should be near equal to its percent of the cumulative mass-velocity product. Since the combination of identical solute compounds will provide greater solute ion activity, millimolality by weight is optimally near millimolarity by activity.

Furthermore, since intracellular pH is determined by changes in venous $CO_2$ and is not directly related to lactate concentrations in extracellular water, bicarbonate ions are included in the solution which control intracellular as well as extracellular pH.

DESCRIPTION OF PREFERRED EMBODIMENT

The composition of the preferred embodiment of the carrier medium of the invention is set forth in the following table.

| Ion | CONCENTRATION IN mM/L | | | | |
| --- | --- | --- | --- | --- | --- |
| | Minimum | Maximum | Preferred | More Preferred | Most Preferred |
| Sodium ($Na^+$) | 75 | 200 | 85–150 | 129–135 | 131 |
| Potassium ($K^+$) | 7 | 25 | 10–20 | 13–15 | 14 |
| Magnesium ($Mg^{++}$) | 3 | 8 | 5 | 5 | 5 |
| Phosphate ($HPO_4^=$) or Sulfate ($SO_4^=$) or Acetate or Gluconate | 3 | 8 | 5 | 5 | 5 |
| Bicarbonate ($HCO_3^-$) | 12 | 28 | 10–30 | 16–20 | 18 |
| Chloride (Cl−) | 70 | 195 | 85–150 | 124–130 | 127 |

The media contains sodium as the principal major cation and chloride as the principal major anion. Potassium and carbonate are the intermediate cation and anion. These ions are selected because their coefficient of mobility with the hydrogen ion (H+) and hydroxyl ion (OH−) are higher with respect to other solutes in any given situation. Magnesium is the principal minor solute cation and the phosphate ion and/or sulfate ion and/or acetate and/or gluconate are the principal minor solute anions. the magnesium, phosphate, sulfate, acetate and gluconate ions assist in stabilization of solute velocity, hence distribution, in the extracellular water.

The solution contains true bicarbonate solute, rather than substituted organic anionic solutes as in conventional solutions. The bicarbonate ion is used because only $CO_2$ gas, H+ and OH− ion solutes move rapidly in all water components. Accordingly, by adjusting the mix of solutes with respect to solute activity as set forth hereinabove, the osmolality of the solution can be accurately controlled to establish partition rates between the total blood volume and the interstitial water in quantities nearly equal to their percentages in the normal body, i.e., 25% and 75%, respectively. By controlling osmolality of the solution as described above the additive carried in the solution is readily dispersed throughout the extracellular water and intracellular water in the ratio in which water systems would be distributed in the normal body without causing imbalance of any water system.

The osmolality of the solution may be varied as desired within a range from about 170 to about 460. Where equiosmolality is desired, i.e., where movement of the carrier media and additive through the total blood volume and interstitial water is desired in ratios nearly equal to normal, osmolality of the carrier media should preferably be adjusted to range from 290 to 310, preferably about 300, the mean osmolality for the extracellular water. It should be noted, however, that osmolality may be varied as desired and the carrier medium, along with its additive, may be concentrated in the intracellular water of either mobile or fixed cell systems, therefore aiding in direct treatment at the desired site. Accordingly, solutions having a total osmolality of less than about 260 can be designed to move into the cells and such solutions are useful in treatment of situations in which water losses have been chronic. Likewise, if the total osmolality is adjusted to about 320 or greater, the solution can be designed to dehydrate the cells.

It will be observed that since physiologically active substances dispersed in the solution described herein may be readily moved into the intracellular water, the effect of such additive will be greatly enhanced because of the low excretion rate of the additive. Furthermore, since the osmolality of the solution is preferably adjusted to near 300, the carrier media, and therefore the additive, is rapidly dispersed throughout the water systems of the body without adversely affecting normal balances. Furthermore, since the carrier medium is preferably adjusted to pHs on the slightly basic side, as contrasted to the normal acidic qualities of conventional solutions, the additive is, in most cases, less likely to suffer damage or inactivation during preparation or storage.

The ionic concentrations set forth above are achieved in an aqueous solution by dissolution of solutes selected on the basis of activity coefficient and mass-velocity product. However, when the solution is itself dispersed in the animal body, further dilution of the solution occurs. Therefore, solutes must be selected which have a high activity coefficient so that upon further dilution the ratios between specific ions in the solution is relatively unaltered.

In preparing the preferred embodiments of the carrier solutions, solutes having an activity coefficient of at least 0.8 or higher at 37°C are selected, particularly for the major and intermediate ions. A typical example is set forth below:

EXAMPLE I

| Solute | Concentration (mM/L) | Mass-Velocity Product | Activity Coefficient |
|---|---|---|---|
| A. NaCl | 113 | 13.25 | 0.85 |
| B. KCL | 14 | 2.26 | 0.93 |
| C. NaHCO$_3$ | 18 | 2.12 | 0.97 |
| D. MgSO$_4$ | 5 | 0.51 | 0.75 |

In order to maintain the desired ionic ratios in the solution after dispersion within the body fluids, the concentration ratios of the solutes should be approximately as follows: (referring to the above example)

$$\frac{\text{Conc. } A}{\text{Conc. } B} \cong \frac{\text{Conc. } A}{\text{Conc. } C}$$

The pH of solutions such as described above may be controlled as desired. Usually, the carrier should be slightly basic, in the range of about 7.8 to 8.1 and may be buffered to maintain approximately the desired pH.

Since the solution is normally slightly basic, the inactivation of many pharmaceutical preparations by dissolution in the carrier is avoided, thereby increasing shelf life and rendering the additive more active when used. For example, many antibiotics are very sensitive to acid conditions but can withstand basic solutions without being deleteriously affected.

The carrier solution described may be used as a medium for transporting any substance which is soluble in water. The additive, when dissolved in the carrier medium, has little effect on the properties of the carrier solution, and moves with the solution throughout the body systems. Molecules as large as albumin dispersed in the carrier medium have been found to readily move with the solution throughout the body water systems as rapidly as smaller ions.

EXAMPLE II

A solution having the concentration indicated under the heading "Most Preferred" in the foregoing table in the description of the preferred embodiment, and having an adjusted pH of about 7.5 was used as an experimental carrier for packed red blood cells and plasma protein in the course of a hemophiliac donor program. The carrier was employed to facilitate the return to the donors of the packed red blood cells (erythrocytes) and plasma protein following extraction from the donated whole blood of the components needed for the donor program. Also employed for this purpose in the program was lactated Ringer's solution, a prior art carrier.

The results presented in the table below are typical of those obtained in over six thousand applications. The comparison between the carrier solution employed in accordance with the present invention and the lactated Ringer's solution appearing in the table is of high validity because the data is derived from successive tests done with one carrier solution and then the other on the same donors during the program, thus eliminating variations which might flow from differences between individuals.

As can be seen from the Table below, equal volumes of packed blood cells and plasma protein and carrier were employed for the solutions being returned to the donors.

A hematocrit measurement was made on each donor just prior to his donation of whole blood, and at a fixed time after readministration of the packed blood cells and plasma protein by means of the carrier. The table reports the percentage decrease in the hematocrit number between these two measurements. Similarly, a percent total blood protein measurement was made on each donor immediately prior to his donation of whole blood and again at a fixed time after the return to him of packed red blood cells and plasma protein by way of the carrier solution. The table reports the percent decrease in the protein numbers between these two measurements.

| Solution Transferred | Carrier of Invention | Lactated Ringer's |
|---|---|---|
| Quantity of solution administered (ml) | 250 | 250 |
| Quantity of Packed Cells and Protein administered (ml) | 250 | 250 |
| % Decrease in Hematocrit Pre-to Post-Transfusion | −4 | −15 |
| % Decrease in Total Protein Pre-to Post-Transfusion | −0 | −25 |

From the foregoing, it can be seen that carrier solutions employed in accordance with the invention produce a near-normal condition in the donors, while the prior art Lactated Ringer's carrier solution leaves the donors in an abnormal or disabled condition with respect to two important blood parameters. As a practical matter, it is possible to have a donor give blood much more frequently when the packed cells and plasma protein are returned to him with the carrier of the present invention because the recuperative time for restoration of his blood parameters to normal condition in readiness for the next donation is much reduced.

EXAMPLE III

Another series of tests was run to determine and illustrate the effect of the carriers of the present invention upon the potency of a physiologically active material, namely an antibiotic, as compared to prior art carrier or transport solutions.

Three carrier solutions were employed in the tests. The first was a solution having the concentration indicated under the heading "Most Preferred" in the foregoing table in the description of the preferred embodiment, and having an adjusted pH of about 7.5. The second was Lactated Ringer's solution, and the third was a 5% dextrose solution in water. A penicillin-type antibiotic, having the tradename Methicillin, was employed for the tests. Ten milligrams of Methicillin was added to 500 milliliters of each of the three carrier solutions. The mixtures so obtained were incubated for 30 minutes at 37°C. One milliliter from each of the three mixtures, after incubation, was mixed with one milliliter of staphylococcus aureus, coagulase positive, thioglycollate broth and those mixtures were incubated. After one hour of incubation and after 24 hours of incubation, identical aliquots were removed and cultured on bacteriological discs for 24 hours. In the Table appearing below, the colony count per milliliter is reported for each of the three solutions for the two periods of incubation.

| Solutions Used | Hours for Incubation in Test Media | |
|---|---|---|
| | After 1 Hour (Colonies per ml.) | After 24 Hours (Colonies per ml.) |
| Solution of Invention | 4 | 8 |
| Lactated Ringer's | 15 | 35 |
| 5% Dextrose in Water | 19 | 35 |

From the foregoing test results, it can be seen that the antibiotic retained its physiologically active properties much more effectively in the carrier of the present invention than in the prior art carriers used for comparison. This circumstance provides a great advantage in the use of the carriers of the invention in connection with antibiotics, because the activity of the antibiotic is maintained and delivered to its point of use in the body undegraded by the carrier.

What is claimed is:

1. A method for administration of solutes to a mammal wherein the solutes are mixed in an aqueous solution, characterized by the aqueous solution having an osmolality in milliosmols/liter of 170 to 460, preferably 260 to 340, more preferably 290 to 310 and most preferably 300, a pH of 7.0 and 8.8 and more preferably between 7.5 and 8.5, and most preferably 8.1 and formed of compounds having an activity coefficient in the solution of at least 0.8 at 37°C to provide concentration in milliosmols/liter of $Na^+$ 75–200, preferably 85–150, more preferably 127–135 and most preferably 131, of $K^+$ 7–25, preferably 10–20, more preferably 13–15 and most preferably 14, of $Mg^{++}$ 3–8 and preferably 5, of $HPO_4^=$ or $SO_4^=$ or Acetate or Gluconate 3–8 and preferably 5, or $HCO_3$ 12–28, preferably 10–30, more preferably 16–20 and most preferably 18 and of $Cl^-$ 70–195, preferably 85–185, more preferably 124–130 and most preferably 127.

2. A method in accordance with claim 1 in which said solute is packed blood cells of the mammal.

3. A method in accordance with claim 1 in which said solute is plasma protein of the mammal.

4. A method in accordance with claim 1 in which said solute is an antibiotic.

5. A method in accordance with claim 4 in which said antibiotic is a penicillin.

6. A method for administration of solutes to a mammal wherein the solutes are mixed in an aqueous solution, characterized by the aqueous solution having an osmolality in milliosmols/liter of 170 to 460, preferably 260 to 340, more preferably 290 to 310 and most preferably 300, and formed of compounds having an activity coefficient in the solution of at least 0.8 at 37°C to provide concentration in milliosmols/liter of $Na^+$ 75–200, preferably 85–150, more preferably 127–135 and most preferably 131, of $K^+$ 7–25, preferably 10–20, more preferably 13–15 and most preferably 14, of $Mg^{++}$ 3–8 and preferably 5, of $HPO_4^+$ or $SO_4^+$ or acetate or gluconate 3–8 and preferably 5, of $HCO_3$ 12–28, preferably 10–30, more preferably 16–20 and most preferably 18 and of $Cl^-$ 70–195, preferably 85–185, more preferably 124–130 and most preferably 127, and a pH insufficiently different from that of the fluid system of the mammal to which it is to be administered to materially alter the system pH.

* * * * *